United States Patent
Speier et al.

(10) Patent No.: US 6,469,121 B1
(45) Date of Patent: Oct. 22, 2002

(54) PROCESS FOR THE PRODUCTION OF ALLOPHANATE MODIFIED ISOCYANATES

(75) Inventors: Jon Speier, Trenton, MI (US); Thirumurti Narayan, Lake Lure, NC (US); Nikolay Lebedinski, West Bloomfield, MI (US)

(73) Assignee: BASF Corporation, Mt. Olive, NJ (US)

( * ) Notice: Subject to any disclaimer, the term of this patent is extended or adjusted under 35 U.S.C. 154(b) by 0 days.

(21) Appl. No.: 09/751,972

(22) Filed: Dec. 29, 2000

(51) Int. Cl.⁷ .............................................. C08G 18/22
(52) U.S. Cl. ...................... 528/56; 560/27; 252/182.22
(58) Field of Search ...................... 560/27; 252/182.22; 528/56

(56) References Cited

U.S. PATENT DOCUMENTS

| 4,738,991 A | 4/1988 | Narayan |
| 5,319,053 A | 6/1994 | Slack et al. |

*Primary Examiner*—Rachel Gorr
(74) *Attorney, Agent, or Firm*—Fernando A. Borrego

(57) ABSTRACT

A method for the preparation of a storage stable organic polyisocyanate having allophanate linkages prepared by reacting a urethane containing organic polyisocyanate with a reactive hydroxyl compound in the presence of a liquid organic titanium oxide, or zirconium oxide, or hafnium oxide catalyst that is fully miscible in the reactive hydroxyl compound is disclosed. After completion of the allophanate reaction, the catalyst is deactivated by the use of a strong inorganic acid, organic acid, organic chloroformate or acid chloride.

31 Claims, No Drawings

PROCESS FOR THE PRODUCTION OF ALLOPHANATE MODIFIED ISOCYANATES

BACKGROUND OF THE INVENTION

The present invention concerns a process for producing storage stable organic polyisocyanates that have allophanate linkages and are a liquid at 25° C. More particularly, the present invention relates to a process for producing storage stable polyisocyanates that have allophanate linkages utilizing a liquid titanate catalyst. U.S. Pat. No. 5,319,053 discloses a liquid MDI prepolymer containing an allophanate modified MDI formed by the reaction of an aliphatic alcohol and a specific isomeric blend of diphenylmethane diisocyanates. The process utilizes typical allophanate catalysts, such as: di-n-butyltin diacetate, di-n-butyltin dichloride, di-n-butyltin dilaurate, triethylenediamine, bismuth nitrate, zinc acetylacetonate, zinc 2-ethylhexanoate, cobalt 2-ethylhexanoate, cobalt naphthenate, and lead linoresinate.

U.S. Pat. No. 4,738,991 discloses a polyisocyanate produced by reacting an organic polyisocyanate with a mono or polyhydric compound to form an allophanate modified polyisocyanate. The reaction is catalyzed using typical catalysts, such as, zinc-, cobalt-, nickel-, ferric-, and aluminum acetylacetonates; and dibutyltin oxide.

All of the above referenced catalysts are powders at room temperature. The catalyst is typically added to the reaction vessel in its powdered form thereby requiring the use of costly recovery equipment to prevent the escape of the catalyst to the outside environment for the protection of the process worker, as well as for the maintenance of the reaction conditions. The powdered catalyst can be difficult to uniformly disperse within the reaction chamber due to sedimentation within the reaction chamber or adherence of the powder to the walls of the reaction vessel.

SUMMARY OF THE INVENTION

It is an object of the present invention provide a process for the production of allophanate modified isocyanates utilizing a catalyst that is a liquid at room temperature and is miscible within the polyol component of the reaction.

In a first embodiment, the present invention comprises a method for the preparation of an allophanate modified polyisocyanate comprising reacting an organic polyisocyanate with a reactive hydroxyl compound in the presence of a catalytic quantity of a liquid organic titanium oxide catalyst that is miscible in the reactive hydroxyl compound; and then adding a catalyst deactivating agent thereby deactivating the organic titanium oxide catalyst.

In a second embodiment, the present invention comprises a method for the preparation of an allophanate modified polyisocyanate comprising reacting an organic polyisocyanate with a reactive hydroxyl compound in the presence of a catalytic quantity of a liquid organic zirconium oxide catalyst that is miscible in the reactive hydroxyl compound; and then adding a catalyst-deactivating agent thereby deactivating the organic zirconium oxide catalyst complex.

In a third embodiment, the present invention comprises a method for the preparation of an allophanate modified polyisocyanate comprising reacting an organic polyisocyanate with a reactive hydroxyl compound in the presence of a catalytic quantity of a liquid organic hafnium oxide catalyst that is miscible in the reactive hydroxyl compound; and then adding a catalyst-deactivating agent thereby deactivating the organic hafnium oxide catalyst complex.

DESCRIPTION OF PREFERRED EMBODIMENTS

In accordance with the present invention storage stable organic polyisocyanates having allophanate linkages are prepared by reacting an organic polyisocyanate such as toluene diisocyanate with a reactive hydroxyl-containing compound such as ethylene glycol in the presence of an organic titanate catalyst, an organic zirconium catalyst, or an organic hafnium catalyst. After completion of the desired allophanate reaction, the catalyst is deactivated by the use of a strong inorganic acid, organic acid, organic chloroformate or organic acid chloride.

Organic polyisocyanates that may be employed include aromatic, aliphatic, and cycloaliphatic polyisocyanates and combinations thereof. Representative of these polyisocyanates are: the isomers of diphenylmethane diisocyanates (MDI); the isomers of toluene diisocyanate (TDI); hexamethylene diisocyanate; tetramethylene diisocyanate; cyclohexane-1,4-diisocyanate; hexahydrotoluene diisocyanate (and isomers); isophorone diisocyanate; hydrogenated diphenylmethane diisocyanate; naphthalene-1,5-diisocyanate; 1-methoxyphenyl- 2,4-diisocyanate; 4,4'-biphenylene diisocyanate; 3,3'-dimethoxy-4,4'-biphenyl diisocyanate; 3,3'-dimethyl-4,4'-biphenyl diisocyanate; 3,3'-dimethyl-diphenylmethane-4,4'-diisocyanate; 4,4', 4"-triphenylmethane triisocyanate; toluene 2,4,6-triisocyanate; 4,4'-dimethyldiphenylmethane-2,2', 5,5'-tetraisocyanate; and polymeric polyisocyanates such as polymethylene polyphenylene polyisocyanate (PMDI). Especially useful due to their availability and properties are the isomers of toluene diisocyanate and diphenylmethane diisocyanate.

The mono and polyhydric reactive compounds that may be reacted with the polyisocyanate preferably have an equivalent weight of from 30 to 1000, can contain up to about 8 hydroxyl groups in the molecule, and can also be well known alkylene oxide adducts thereof or polyols. The polyalkylene polyols may be prepared by any known process such as, for example, the process disclosed by Wurtz in 1859 and Encyclopedia of Chemical Technology, Vol. 7, pp. 257–262, published by Interscience Publishers, Inc. (1951) or in U.S. Pat. No. 1,922,459.

Monohydric alcohols that may be employed include both aliphatic and aromatic alcohols such as: methanol; ethanol; propanol; 2-propanol; n-butanol; 2-chloroethanol; pentanol; n-octanol; 2-ethylhexanol; isooctyl alcohol; nonanol; 3,5,5-trimethylhexanol; isodecyl alcohol; benzyl alcohol; cyclohexanol, 2,4,4,4-tetrachloro-1 -butanol; 2,3-dichloropropanol; 2,3-dibromopropanol; 2,2,2-tricholoroethanol; 2,2,2-triboromoethanol; 1,1,1,3,3,3-hexachloro-2-propanol; 1,1-dichloro-2-propanol; 1,3-dibromo-2-propanol; 1,1,1-trichloro-2-propanol; 1,3-dibromo-2-propanol; 1,1,1-trichloro-2-propanol; 1,1,3,3-tetrabromo-2-propanol; isomeric tribromophenols; isomeric tetrachlorophenols; pentachlorophenol; 2-methylol-1,4,5,6,7,7-hexachlorobicyclo(2.2.1)-5-heptene and the like; and alkylene oxide adducts thereof. The alkylene oxide may be ethylene oxide, propylene oxide, butylene oxide, amylene oxide or mixtures thereof.

Polyhydric alcohols that may be utilized in the present invention include both aliphatic and aromatic compounds, for example: ethylene glycol; trimethylene glycol; propylene glycol; 1,4-butanediol; 1,3-butanediol; 1,6-hexanediol; 1,7-heptanediol; glycerine; 1,1,1-trimethylolpropane; 1,1,1-trimethylolethane; hexane-1,2,6-triol; a-methyl glucoside; pentaerythritol; sorbitol; diethylene glycol; dipropylene glycol, 2,3-dibromo-1,4-butenediol; 1,4, dibromoneopentyl glycol; 4,4'-isopropylidene diphenol, also know as Bisphenol A; tetrabromobisphenol A; dibromobisphenol A; resorcinol; catechol; hydroquinone; and alkylene oxide adducts thereof.

In one embodiment, the allophanate catalysts that are employed in the present invention are organic titanium oxide complexes. Examples of suitable complexes for use with the present invention include titanium propoxide and tetrabutoxy titanate. In a second embodiment of the present invention zirconium oxide complexes that exhibit similar properties to those of the titanium oxide complexes may be used in place of the titanium oxide complexes. In a third embodiment, hafnium oxide complexes that are liquid can be used as the catalyst. All of the useful catalysts are liquids over a temperature range of −55° C. to 312° C. The catalysts are also fully miscible in the selected reactive hydroxyl compound. One preferred catalyst for use in the present invention is tetrabutoxy titanate. The catalysts are used in an amount of from 0.001 to 0.05 weight percent based on the total weight of all of the reaction components.

The catalyst deactivators that may be employed in the present invention are aliphatic and aromatic acid chlorides, such as: acetyl chloride; benzoyl chloride; benzenesulfonyl chloride; oxalyl chloride; adipyl chloride; sebacyl chloride; and carbonyl chloride. Also inorganic acids such as perchloric acid, and strong organic acids such as trifluoromethanesulfonic acid and trifluoroacetic acid may be employed as catalyst deactivators.

Chloroformates may also be employed as catalyst deactivators, examples include: methyl chloroformate; ethyl chloroformate; isopropyl chloroformate; n-butyl chloroformate; sec-butyl chloroformate; and diethylene glycol bis chloroformate.

The allophanate modified isocyanates of the present invention are prepared by reacting an organic polyisocyanate, as disclosed above, with a mono- or polyhydric compound in the presence of an organic titanium oxide catalyst. The amount of mono- or polyhydric compound employed is chosen so that the allophanate modified isocyanate has a free NCO content that is at least 3 percent. Typically a ratio of polyisocyanate to reactive hydroxyl containing compound of 3 to 1 will yield the minimum free NCO content of 3 percent. A preferred free NCO content of the allophanate modified isocyanates of the present invention is from 28 to 42 percent. Generally, a molar ratio of polyisocyanate to reactive hydroxyl containing compound of 31 to 1 will yield a free NCO content of 29.5 percent. Preferably the molar ratio of polyisocyanate to reactive hydroxyl containing compound is from 29:1 to 31:1.

In the general process, the isocyanate reactive hydroxyl containing compound and titanium oxide catalyst are mixed in a vessel at a temperature of from about 60–65° C. The contents are reacted until substantially all of the reactive hydroxy-containing compound has reacted with the isocyanate. The temperature of the reaction vessel is then raised to approximately 105° C.±10° C. and the allophanate reaction is allowed to proceed for 3 to 10 hours. Upon completion of the reaction, a catalyst deactivator is added to stop the reaction, as well as to prevent the degradation of the allophanate modified isocyanate during storage.

The following examples are intended to illustrate, but in no way limit, the scope of the present invention. All of the parts indicated are by weight, unless otherwise indicated. The abbreviations utilized are as follows: TDI is a mixture of 2,4 and 2,6 toluene diisocyanate with 80% 2,4 and 20% 2,6 isomers; catalyst is a tetrabutoxy titanate; polyhydric compound is ethylene glycol; catalyst deactivator is benzoyl chloride; MDI is a 2,4'–4,4' MDI blend with 50% 2,4' and 50% 4,4' isomers. Table 1, below, summarizes the properties of the examples.

EXAMPLE 1

In a reaction vessel equipped with agitation 484.25 grams of TDI, with a NCO content of 48.3% by weight, are placed and the vessel is heated to 65° C. Tetrabutoxy titanate (0.06 grams) is dissolved in 3.127 grams of ethylene glycol. The solution is added to the reaction vessel at a constant rate over a period of approximately 15 minutes. After the addition of the solution the temperature increases to approximately 97° C., due to the exothermic reaction. A sample of the reaction product at this stage has a NCO content of 41.87% by weight indicating that of the ethylene glycol has reacted and that the allophanate reaction has commenced. The reaction temperature is increased to approximately 103–105° C. and maintained at that temperature for approximately 5 hours. A sample of the reaction product is analyzed after 5 hours and has a NCO content of approximately 39.2% by weight. Then 0.06 grams of benzoyl chloride is added to deactivate the catalyst. An analysis of the final reaction product reveals a viscosity of 28 centipoise at 25° C.

EXAMPLE 2

In a reaction vessel equipped with agitation 489.8 grams of MDI, with a NCO content of 33.6% by weight, are placed and the vessel is heated to 65° C. Tetrabutoxy titanate (0.1 grams) is dissolved in 10.0 grams of ethylene glycol. This solution is added to the reaction vessel at a constant rate over a period of approximately 30 minutes. After the addition of the solution, a sample of the reaction product is tested and indicates an NCO content decrease to 30.34% by weight signaling that all of the ethylene glycol has reacted and that the allophanate reaction has commenced. The reaction temperature is increased to approximately 103–105° C. and maintained at that temperature for approximately 5 hours. A sample of the reaction product is analyzed after the 5-hour period and has a NCO content of approximately 27.53% by weight. Then 0.01 grams of benzoyl chloride are added to deactivate the catalyst. An analysis of the final reaction product indicates a viscosity of 159 centipoise at 25° C.

TABLE 1

|  | Example 1 | Example 2 |
| --- | --- | --- |
| MDI (grams) |  | 489.8 |
| TDI (grams) | 484.25 |  |
| Catalyst (grams) | 0.06 | 0.1 |
| Polyhydric Compound (grams) | 3.127 | 10.0 |
| Catalyst deactivator (grams) | 0.06 | 0.01 |
| End Product viscosity (cp) at 25° C. | 28 | 159 |
| End product free NCO % by weight | 39.2 | 27.53 |

What is claimed is:

1. A method for the preparation of an allophanate modified polyisocyanate comprising:

a) reacting an organic polyisocyanate with a reactive hydroxyl compound in the presence of a catalytic quantity of a liquid organic titanium oxide catalyst that is miscible in the reactive hydroxyl compound; and b) adding a catalyst deactivating agent thereby deactivating the organic titanium oxide catalyst.

2. The method of claim 1, wherein step a) comprises adding the organic titanium oxide catalyst in an amount of from 0.001 to 0.05 weight percent based on the total weight of the reaction components.

3. The method of claim 1, wherein step a) comprises adding a catalytic quantity of tetrabutoxy titanate.

4. The method of claim 1, wherein step a) comprises reacting an organic polyisocyanate comprising a TDI (toluene dissocyanate).

5. The method of claim 1, wherein step a) comprises reacting an organic polyisocyanate comprising an MDI (diphenyl methane dissocyanate).

6. The method of claim 1, wherein step a) comprises providing a molar ratio of organic polyisocyanate to reactive hydroxyl compound of from 29:1 to 31:1.

7. The method of claim 1, wherein step a) comprises providing a monohydric compound as the reactive hydroxyl compound.

8. The method of claim 1, wherein step a) comprises providing a polyhydric compound as the reactive hydroxyl compound.

9. The method of claim 1, wherein step b) comprises selecting the catalyst deactivating agent from the group consisting of aliphatic acid chlorides, aromatic acid chlorides, inorganic acids, organic acids, and chloroformates.

10. The method of claim 1, further comprising reacting the organic polyisocyanate with the reactive hydroxyl compound in the presence of the organic titanium oxide catalyst complex at a first temperature until substantially all of the reactive hydroxyl compound has reacted with the polyisocyanate and then increasing the temperature to a second temperature and maintaining the second temperature for a period of time from 3 to 10 hours.

11. The method of claim 10, wherein the first temperature is maintained at from 55 to 70° C. and the second temperature is maintained at from 95 to 115° C.

12. A method for the preparation of an allophanate modified polyisocyanate comprising:
   a) reacting an organic polyisocyanate with a reactive hydroxyl compound in the presence of a catalytic quantity of a liquid organic zirconium oxide catalyst that is miscible in the reactive hydroxyl compound; and
   b) adding a catalyst-deactivating agent thereby deactivating the organic zirconium oxide catalyst complex.

13. The method of claim 12, wherein step a) comprises adding the organic zirconium oxide catalyst in an amount of from 0.001 to 0.05 weight percent based on the total weight of the reaction components.

14. The method of claim 12, wherein step a) comprises reacting an organic polyisocyanate comprising a TDI (toluene dissocyanate).

15. The method of claim 12, wherein step a) comprises reacting an organic polyisocyanate comprising an MDI (diphenyl methane dissocyanate).

16. The method of claim 12, wherein step a) comprises providing a molar ratio of organic polyisocyanate to reactive hydroxyl compound of from 29:1 to 31:1 .

17. The method of claim 12, wherein step a) comprises providing a monohydric compound as the reactive hydroxyl compound.

18. The method of claim 12, wherein step a) comprises providing a polyhydric compound as the reactive hydroxyl compound.

19. The method of claim 12, wherein step b) comprises selecting the catalyst deactivating agent from the group consisting of aliphatic acid chlorides, aromatic acid chlorides, inorganic acids, organic acids, and chloroformate.

20. The method of claim 12, further comprising reacting the organic polyisocyanate with the reactive hydroxyl compound in the presence of the organic zirconium oxide catalyst at a first temperature until substantially all of the reactive hydroxyl compound has reacted with the polyisocyanate and then increasing the temperature to a second temperature and maintaining the second temperature for a period of time from 3 to 10 hours.

21. The method of claim 20, wherein the first temperature is maintained at from 55 to 70° C. and the second temperature is maintained at from 95 to 115° C.

22. A method for the preparation of an allophanate modified polyisocyanate comprising:
   a) reacting an organic polyisocyanate with a reactive hydroxyl compound in the presence of a catalytic quantity of a liquid organic hafnium oxide catalyst that is miscible in the reactive hydroxyl compound; and
   b) adding a catalyst-deactivating agent thereby deactivating the organic hafnium oxide catalyst complex.

23. The method of claim 22, wherein step a) comprises adding the organic hafnium oxide catalyst in an amount of from 0.001 to 0.05 weight percent based on the total weight of the reaction components.

24. The method of claim 22, wherein step a) comprises reacting an organic polyisocyanate comprising a TDI (toluene dissocyanate).

25. The method of claim 22, wherein step a) comprises reacting an organic polyisocyanate comprising an MDI (diphenyl methane dissocyanate).

26. The method of claim 22, wherein step a) comprises providing a molar ratio of organic polyisocyanate to reactive hydroxyl compound of from 29:1 to 31:1.

27. The method of claim 22, wherein step a) comprises providing a monohydric compound as the reactive hydroxyl compound.

28. The method of claim 22, wherein step a) comprises providing a polyhydric compound as the reactive hydroxyl compound.

29. The method of claim 22, wherein step b) comprises selecting the catalyst deactivating agent from the group consisting of aliphatic acid chlorides, aromatic acid chlorides, inorganic acids, organic acids, and chloroformate.

30. The method of claim 22, further comprising reacting the organic polyisocyanate with the reactive hydroxyl compound in the presence of the organic hafnium oxide catalyst at a first temperature until substantially all of the reactive hydroxyl compound has reacted with the polyisocyanate and then increasing the temperature to a second temperature and maintaining the second temperature for a period of time from 3 to 10 hours.

31. The method of claim 30, wherein the first temperature is maintained at from 55 to 70° C. and the second temperature is maintained at from 95 to 115° C.

* * * * *